United States Patent [19]

Jolivet et al.

[11] 4,198,497
[45] Apr. 15, 1980

[54] N-SUBSTITUTED ACRYLAMIDINES, COPOLYMERS OF N-SUBSTITUTED ACRYLAMIDINES AND ESTERS OF ACRYLIC AND METHACRYLIC ACID AND USES OF THE COPOLYMERS

[75] Inventors: Yannick Jolivet, Le Havre; Christian Lachévre, Saint Mande, both of France

[73] Assignee: Compagnie Francaise de Raffinage, Paris, France

[21] Appl. No.: 832,065

[22] Filed: Sep. 9, 1977

Related U.S. Application Data

[62] Division of Ser. No. 729,139, Oct. 4, 1976, Pat. No. 4,062,787.

[30] Foreign Application Priority Data

Oct. 6, 1975 [FR] France .................................. 75 30537

[51] Int. Cl.² .................... C08F 12/28; C08F 20/52;
C08F 22/52; C08F 220/68
[52] U.S. Cl. ................................ 526/310; 252/51.5 A;
260/564 A; 526/264; 526/265; 526/291;
526/292; 526/293; 526/309; 526/923
[58] Field of Search ............... 526/310, 265, 264, 292

[56] References Cited

U.S. PATENT DOCUMENTS 3,954,863   5/1976   Fuks ...................................... 526/923

*Primary Examiner*—Joseph L. Schofer
*Assistant Examiner*—Herbert J. Lilling
*Attorney, Agent, or Firm*—Haseltine, Lake & Waters

[57] ABSTRACT

N-substituted acrylamidines having the general formula:

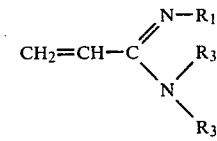

in which $R_1$ is an isopropyl group,
$R_2$ and $R_3$ each is hydrogen, ethyl, propyl, butyl, pentyl, octyl, or octadecyl. The acrylamidine is copolymerized with at least one ester of acrylic and/or methacrylic acid esters, and the copolymer has use as an oil additive and for the manufacture of molded articles, paints and adhesives.

3 Claims, No Drawings

N-SUBSTITUTED ACRYLAMIDINES, COPOLYMERS OF N-SUBSTITUTED ACRYLAMIDINES AND ESTERS OF ACRYLIC AND METHACRYLIC ACID AND USES OF THE COPOLYMERS

This is a division of application Ser. No. 729,139 filed Oct. 4, 1976 now U.S. Pat. No. 4,062,787 issued Dec. 13, 1977.

FIELD OF THE INVENTION

The present invention relates to new N-substituted acrylamidines, copolymers of N-substituted acrylamidines and esters of acrylic and/or methacrylic acids, and uses of the said copolymers.

BACKGROUND

There has already been prepared a number of copolymers of esters of acrylic or methacrylic acids. These esters copolymerize with a great number of types of monomers for example, ethylene, styrene, acrylonitrile, vinyl chloride or vinyl acetate.

According to the monomers employed, these copolymers can be utilized for the production of molded objects, paints or adhesives.

Certain of these copolymers can also be utilized as additives to lubricating oils. This is notably the case of copolymers of esters of acrylic or methacrylic acid with basic monomers containing two atoms of nitrogen such as N-vinylimidazole or one atom of nitrogen and one atom of oxygen such as N-vinyl-pyrrolidone.

The addition of these nitrogen copolymers to oils produces an improvement in their index of viscosity.

The improvement of this index viscosity, determined according to the standard AFNOR NF T-60-136 shows that the effect of temperature on the viscosity is reduced.

These copolymers can additionally reduce the flow point of the oils and due to the polarity and the basicity of the nitrogen monomer, provide a dispersing and detergent power in the additive, thereby contributing to the cleaning of a motor lubricated by these oils.

SUMMARY OF THE INVENTION

Applicant has succeeded in copolymerizing the esters of acrylic and/or methacrylic acids with monomers heretofore not employed, namely N-substituted acrylamidines, certain of which are presently unknown, which monomers are very useful by reason of their polar and basic properties.

An object of the present invention is consequently the preparation of novel N-substituted acrylamidines.

Another object of the invention is to prepare copolymers of N-substituted acrylamidines and esters of acrylic and/or methacrylic acids. The said copolymers can additionally contain at least one other monomer.

Another object of the invention is to provide new additives for lubricating oils.

A further object of the invention is the application of the above-noted copolymers for the formation of molded objects, paints or adhesives.

N-substituted acrylamidines have the general formula

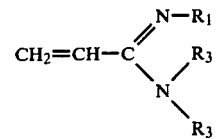

These acrylamidines can be prepared by the method disclosed by FUKS in an article appearing in the "European Polymer Journal," volume 9, pages 835–845, 1973.

This synthesis consists of reacting acrylonitrile, an alkyl halogenide, a Lewis acid and an amine, to obtain a salt of N-alkylacrylonitrilium which is then subjected to aminolysis.

FUKS has succeeded in preparation of the following acrylamidines:

N,N' diisopropylacrylamidine of the formula

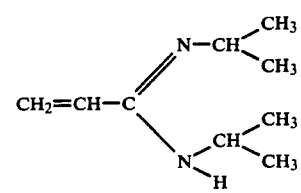

N,N' triisopropylacrylamidine of the formula

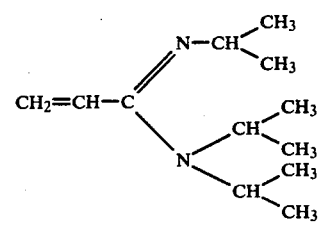

N,N' isopropylphenylacrylamidine of the formula

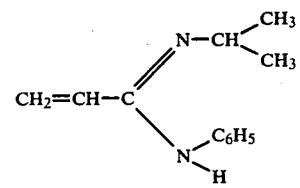

N,N' isopropylmethylphenylacrylamidine of the formula

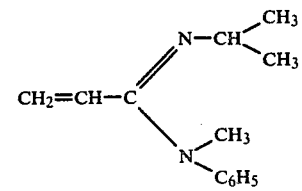

Following the method of FUKS, the applicant has succeeded in producing the following novel acrylamidines:

N$_2$N' isopropyldiethylacrylamidine

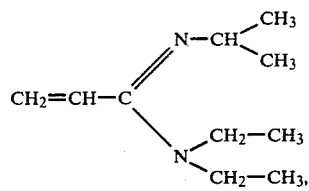

N,N' isopropyldibutyl-2 acrylamidine

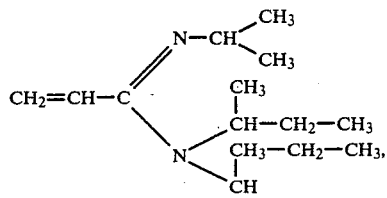

N,N' isopropyldioctylacrylamidine

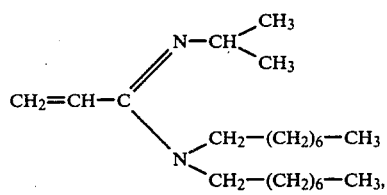

N,N' isopropyldioctadecylacrylamidine

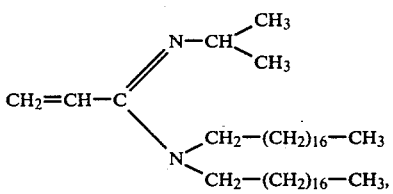

N,N' isopropylpropylacrylamidine

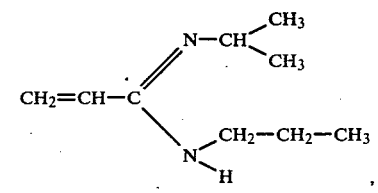

N,N' isopropyldipentyl acrylamidine

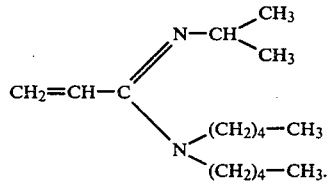

The copolymers according to the invention are copolymers of at least one N-substituted acrylamidine and at least one ester of acrylic and/or methacrylic acid and containing from 0.1-99.9% and from 99.9-0.1% by weight and preferably from 0.1-10% and from 99.9-90% by weight of these two monomers.

The acrylamidines which can be copolymerized are according to the general formula indicated previously.

In this formula $R_1$ is selected from the group consisting of branched alkyl groups. Applicant has successfully utilized acrylamidines where $R_1$ is an isopropyl group.

$R_2$ and $R_3$ each represent a group which can contain up to 18 carbon atoms and selected from the group consisting of hydrogen, alkyl, alkenyl, aryl, alkaryl, aralkyl, cycoalkyl, cycloalkenyl, bicycloalkyl, haloalkyl, haloaryl, haloalkyaryl, pyridyl, hydroxyalkyl and hydroxyarl.

The esters of acrylic and methacrylic acids can be esters of a saturated aliphatic alcohol having from 1 to 20 carbon atoms.

These copolymers can additionally contain at least one third monomer substance which can be, for example, N-vinylpyrrolidone, styrene, vinyl acetate, isoprene or butadiene.

The copolymerization of these monomers is effected by radicalization in the presence of an initiator of free radicals. The applicant has utilized with success $\alpha,\alpha'$-azobisisobutyronitrile, which will be designated by the term AIBN hereafter in the description.

Other initiators of polymerization by radicalization are, for example, peroxides, such as benzoyl peroxide, which can also be utilized.

The process of preparation according to the invention consists of introducing, at a pressure equal to or greater than atmospheric pressure, into a reactor maintained under an inert gaseous atmosphere, for example, dry nitrogen, the monomers and a solvent which can be, for example, benzene, toluene, hexane, cyclohexane, tetrahydrofuran or a lubricating base oil. The reaction medium is agitated and the initiator is then added. The reactor is placed in a thermostatic bath.

The conditions of the reaction, such as the concentrations of the monomer and the initiator, the type of initiator, and of the solvent, vary according to the desired polymer.

The duration of the reaction and the temperature which can be, for example, between 40° and 100° C. also depends on the desired copolymer as well as the solvent and the initiator.

At the end of the reaction, the copolymers are separated from the reaction medium by precipitation in a non-solvent selected according to the copolymer, the non-solvent being methanol or cyclohexane. This separation is not necessary if the reaction medium is constituted by an lubricating base oil.

The copolymer thus formed is then dried under vacuum.

The copolymers thus prepared can be characterized by their average molecular weight measured by osmometry and by their percentage of nitrogen measured by conventional methods.

The number average molecular weight $\overline{M}n$ of these copolymers can be between 5000 and 1,000,000.

These copolymers can be utilized for the production of molded objects, paints or adhesives.

These copolymers also have useful properties permitting their application as additives to multifunctional lubricating oils. The compositions thus obtained preferably contain from 0.5 to 10% by weight of such additives.

It is prefereable, to assure the solubility of the copolymers in the hydrocarbon oils, that the ester of the acrylic and/or methacrylic acids be selected from the group consisting of esters of a saturated aliphatic alcohol having 8 to 14 carbon atoms.

The examples which follow and which do not constitute any limitation whatsoever on the invention concern the preparation of N-substituted acrylamidines and the copolymers according to the invention as well as the application of the said copolymers as additives to multifunctional lubricating oils.

DESCRIPTION OF THE PREFERRED EMBODIMENTS

EXAMPLE I

This example concerns the preparation of six new N-substituted acrylamidines. The method of preparation has been described by FUKS in the previously noted article.

It consists, firstly, of a synthesis of a complex constituted by tetrachloroferrate of N-isopropylacrylonitrilium referred to hereafter as the "complex," according to the probable reaction $$(CH_3)_2CHCl + FeCl_3 + CH_2=CH-C\equiv N \longrightarrow$$
$$CH_2=CH-C\equiv N^+-CH(CH_3)_2 \ FeCl_4^-.$$

In a dry reactor and under nitrogen there is introduced 0.4 mole of ferric chloride and 380 cm³ of chloro-2-propane. The mixture is cooled to 0° C. under agitation.

There is then added dropwise 0.4 mole of acrylonitrile in solution in 20 cm³ of chloro-2-propane.

The mixture is maintained at 0° C. for 30 minutes then it is raised to ambient temperature. A crystallized yellow-green product constituted by the "complex" begins to appear. The chloro-2-propane which has not undergone reaction is removed by evaporation under vacuum or by filtration and drying.

The yield of the "complex" is 80%.

After this step of synthesis of the "complex" it is subjected to aminolysis according to the probable reaction:

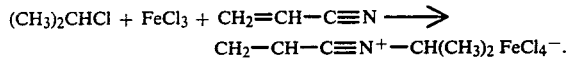

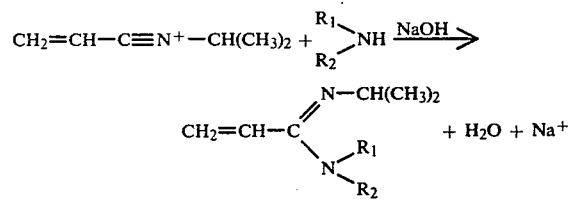

There is added to the "complex" 220 cm³ of methylene chloride. The mixture is raised to the amination temperature under an inert atmosphere.

There is added dropwise 0.4 mole of amine in solution in 20 cm³ of methylene chloride. The mixture is maintained for 1 hour under agitation, the temperature being slightly raised. The solvent is then evaporated under vacuum.

The salt of the acrylamidine which is formed is cooled to −10° C. and 1.68 mole of a 30% aqueous solution of sodium hydroxide is added. After agitation, the acrylamidine is extracted by ethylether, heptane or methylene chloride according to the product prepared.

The different conditions of preparation and the yields in weight are given hereafter in table 1.

TABLE 1

| Prepared acryl amidine | Temperature at the beginning of amination °C. | Temperature at the end of amination °C. | Yield in percent by weight |
|---|---|---|---|
| N, N' isopropyl diethylacrylamidine | −10 | 10 | 67 |
| N, N' isopropyl-dibutylacrylamidine | −10 | 10 | 43.3 |
| N, N' isopropyl-dipentylacrylamidine | 0 | 20 | 35 |
| N, N' isopropyl-dioctylacrylamidine | 20 | 30 | 9.4 |
| N, N' isopropyl-propyl acrylamidine | −10 | 10 | 32 |
| N, N' isopropyl-dioctadecyl-acrylamidine | 20 | 40 | 0.6 |

For N,N' isopropyldioctadecylacrylamidine, the conditions of preparation are slightly different as the starting amine is not soluble in methylene chloride.

0.057 moles of dioctadecyl amine in suspension in 150 cm³ of methylene chloride is added at 20° C. to 0.05 mole of "complex" dissolved in 50 cm³ of methylene chloride.

The mixture is held at reflux temmperature (40° C.) for 2 hours then the methylene chloride is evaporated under vacuum. 0.024 mole of a 30% aqueous solution of sodium hydroxide is then added. The acrylamidine is extracted by ethyl ether then purified by recrystallization in acetone.

The N-substituted acrylamidines have been characterized by nuclear magnetic resonance and infrared spectrometry.

EXAMPLE 2

This example concerns the preparation of copolymers of acrylamidines and esters of acrylic and/or methacrylic acids according to the invention.

There is introduced in a reactor provided with a system of agitation and cooling, the solvent, the monomers and the initiator. The reactor, maintained under nitrogen atmosphere, is placed in a thermostatic bath. When the selected reaction temperature has been reached, the copolymers are separated from the reaction medium by precipitation in a non-solvent.

There is summarized hereafter in table 2 the different parameters of the tests which have been run and in table 3 there is given the properties of the prepared products, namely, the number average molecular weight $\overline{M}n$ and the percentage by weight of nitrogen.

TABLE 2

| Tests | Solvent | Ester | Acrylamidine | Third monomer | Concentration in the reaction medium in moles per liter of ester | acryla-midine | Third monomer | AIBN | temperature in °C. | Time in hours | Composition of the non-solvent utilized for the precipitation |
|---|---|---|---|---|---|---|---|---|---|---|---|
| A | | Methyl acrylate | N, N' diisopropylacrylamidine | | 3.37 | 0.33 | 0 | 0.0104 | 60 | 1 | 30 volumes of cyclohexane for volume of benzene solution |
| B | | | | | 3.87 | 0.05 | 0 | 0.0103 | 60 | 3.5 | |
| C | benzene | | N, N' triisopropylacrylamidine | | 2.12 | 0.10 | 0 | 0.0062 | 70 | 7 | |
| D | | Methyl methacrylate | | | 1.43 | 0.31 | 0 | 0.0062 | 70 | 7 | |
| E | | | | | 1.83 | 0.13 | 0 | 0.0062 | 70 | 7 | |
| F | | Lauryl methacrylate | N, N' diisopropyl-acrylamidine | | 1.82 | 0.27 | 0 | 0.0077 | 80 | 3 | |
| G | toluene | | | | 1.23 | 0.10 | 0 | 0.0950 | 80 | 1 | |
| H | | | | | 2.00 | 1.02 | 0 | 0.0078 | 80 | 3 | |
| I | | | | | 1.85 | 0.17 | 0 | 0.0030 | 80 | 3 | Methanol |
| J | 200 Neutral base oil | | | | 1.34 | 0.22 | 0 | 0.0085 | 80 | 5 | |
| K | | | | N-vinyl pyrrolidone | 1.82 | 0.14 | 0.14 | 0.0077 | 80 | 3 | |
| L | | | N, N' isopropylphenyl-acrylamidine | | 1.98 | 1.02 | 0 | 0.0078 | 80 | 3 | |
| M | toluene | | | | 1.82 | 0.27 | 0 | 0.0150 | 80 | 3 | |
| N | toluene | mixture 1 ** | N, N' diisopropylacryl-amidine | | ** | 0.20 | 0 | 0.0094 | 80 | 3 | Methanol |
| O | | mixture 2 *** | N, N' isopropyldiethyl-acrylamidine | | *** | 0.16 | 0 | 0.0074 | 80 | 3 | |
| P | | | N, N' isopropylpropyl-acrylamidine | | *** | 0.16 | 0 | 0.0074 | 80 | 3 | |

** The mixture 1 has the following composition (concentration in the reaction medium in moles per liter):
Butyl methacrylate 0.043
Hexyl methacrylate 0.073
Ethylhexyl methacrylate 0.140
Lauryl methacrylate 0.270
Stearyl methacrylate 0.540
Ethylhexyl methacrylate 0.067
*** The mixture 2 has the following composition (concentration in the reaction medium in moles per liter):
Lauryl methacrylate 1.030
Stearyl methacrylate 0.650
Stearyl acrylate 0.040

TABLE 3

| Test | Yield in % by weight of copolymer | Properties of the copolymer Mn | % nitrogen by weight |
|---|---|---|---|
| A | 16.0 | 105000 | 1.06 |
| B | 57.3 | 258000 | 0.19 |
| C | 59.0 | 43000 | 0.26 |
| D | 32 | 26000 | 0.22 |
| E | 48.5 | 42000 | 0.54 |
| F | 71.5 | 53000 | 0.64 |
| G | 63 | 71000 | 0.34 |
| H | 77 | 78000 | 2.40 |
| I | 67 | 127000 | 0.42 |
| J | 74 | 68000 | 0.58 |
| K | 72.5 | 85000 | 0.41 |
| L | 35.5 | 170000 | 1.12 |
| M | 87.1 | 41000 | 0.90 |
| N | 81 | 44000 | 0.77 |
| O | 78.6 | 76000 | 0.06 |
| P | 86.8 | 75000 | 0.23 |

*0.33% N comes from acrylamide
0.08% N comes from N-vinylpyrrolidone

EXAMPLE 3

This example concerns tests of viscosity which were effected, on the one hand, on a base oil not containing an additive and, on the other hand, on the same oil to which there has been added a copolymer according to the invention.

A 7.7% by weight of the copolymer G prepared in the previous example in added to a 200 Neutral base oil.

The viscosities at 210° F. (99° C.) and at 100° F. (37.8° C.) of the base oil and of the modified oil were measured and their indices of viscosities have been calculated.

The results are given in table 4 hereafter.

TABLE 4

| | Viscosity at 210° F. in centistokes | at 100° F. in centistiokes | Index of viscosity |
|---|---|---|---|
| 200 Neutral oil | 6,3 | 44 | 100 |
| 200 Neutral oil with additive G | 14,95 | 104,65 | 161 |

This example illustrates the beneficial effect of the copolymers according to the invention as additives in improving the viscosity of the oils.

EXAMPLE 4

This example concerns a test effected on the base oil 200 N containing 6.1% by weight of copolymer F prepared in Example 2.

This oil is subjected to a mechanical shear test on an ORBAHN injector according to the standard DIN 50-382.

The viscosity of this oil is measured at 210° F. before and after testing:
- viscosity before test: 15.05 centistokes;
- viscosity after test: 14.41 centistokes (30 cycles).

The percentage of the drop of the initial viscosity is only 4.5% which is a very good result and shows the stability of the copolymer to the mechanical shear.

EXAMPLE 5

This example concerns a test intended to show the dispersing and detergent property of the copolymers according to the invention when they are used as additives for lubricating oils.

It consists in the determination of the PAPOK index which permits, by means of laboratory test, to evaluate the action at elevated temperatures of these additives in relation to the products of degradation of the base oil and of zinc dithiophosphate base additives.

Two solutions are prepared:
- one containing 2.5% by weight of the additive to be tested in a 350 Neutral base oil (the additive is constituted by a solution in the base oil of about 50% by weight of copolymer);
- the other containing 2.5% by weight of zinc dithiophosphate in a 350 Neutral base oil.

The two solutions are mixed and the limit concentration of zinc dithiophosphate is determined for which there will be no deposit at 210° C., at the end of 30 minutes.

The PAPOK index I.P. is equal to the relation:

$$\frac{\text{concentration of zinc dithiophosphate}}{\text{concentration of additive}} \times 10$$

The greater the PAPOK index, the greater the dispersant and detergent action of the additive, as the limit concentration of zinc dithiophosphate for which there is no longer a deposit is greater.

This index is measured for three additives:
(a) for a commercial control additive T1, non-dispersing and nondetergent, constituted by polyisobuylene of number average molecular weight equal to $65.10^3$ and a nitrogen percentage (%N) equal to 0;
(b) for a commercial control additive T2, which is dispersing and a detergent, constituted by a copolymer of alkyl methacrylate, alkyl acrylate and a nitrogen monomer for which $\overline{Mn}=67.10^3$ and %N=0.62;
(c) for the copolymer G prepared in example 2, for which $\overline{Mn}=71.10^3$ and %N=0.34.

The PAPOK index I.P., measured for these three additives is the following:
- T1: I.P.=0.5;
- T2: I.P.=11.4;
- G: I.P.=16.3.

The copolymers according to the invention, therefore have a good dispersing property.

EXAMPLE 6

This example concerns a motor test adapted to show the stability at high temperature of a lubricating oil to which there has been added, as a multifunctional viscosity additive, the copolymer G according to the invention prepared in Example 2. The same test has been also undertaken by way of comparison with two other commercial additives, T3 and T4, for improving the viscosity and taken from the family of copolymers of methacrylate and alkyl acrylate. T3 is a non-dispersing additive and T4 is a dispersing and detergent additive.

The motor test was effected according to the standard CEC L-02-A-69 on a PETTER W 1 L motor which is a test motor having controlled ignition.

A lubricating oil was prepared from an oil to which the same detergents and the same inhibitors were added in the same percentages. This oil was separated into three samples and to these samples were respectively added 7% by weight of G, 7% by weight of T3 and 6.5% by weight of T4. The obtained oils had the same properties at high and low temperature (category SAE 20W50), and had the same percentage of drop of initial viscosity (6.5%) when they were subjected to the mechanical shear test on the Orbahn injector according to the standard DIN 51-382 (30 cycles).

The results obtained from the motor tests CEC L-20-A-69 are given in table V hereafter:

| Results | Additive | | |
|---|---|---|---|
| | G | T3 | T4 |
| Freedom of the rings* | 10 | 10 | 10 |
| Varnish of the piston lands* | 8.1 | 7.0 | 7.4 |
| Piston undercrown | 9.4 | 8.8 | 8.0 |
| Total loss in weight of the two half-bearings in mg | 31 | 40 | 41 |
| Increase of viscosity at 100° F. in % | 25 | 62 | 82 |

*The maximum result is equal to 10

This table shows that the performance of the oil to which the copolymer G has been added is excellent and superior to the oil to which T3 and T4 have been added.

What is claimed is:
1. A copolymer of from 0.1 to 99.9% by weight of lauryl methacrylate and from 99.9 to 0.1% by weight of N,N'-diisopropyl acrylamidine.
2. A copolymer of 0.1 to 99.9% by weight of a mixture of butyl methacrylate, hexyl methacrylate, ethylhexyl methacrylate, lauryl methacrylate, stearyl methacrylate and 2-ethylhexyl methacrylate and 99.9 to 0.1% by weight of N,N'-diisopropylacrylamidine.
3. A copolymer of 0.1 to 99.9% by weight of a mixture of lauryl methacrylate, stearyl methacrylate and stearyl acrylate and 99.9 to 0.1% by weight of an acrylamidine selected from the group consisting of N,N'-isopropyldiethyl acrylamidine and N,N'-isopropylpropylacrylamidine.

* * * * *